(12) United States Patent
Bonelli

(10) Patent No.: US 6,207,048 B1
(45) Date of Patent: Mar. 27, 2001

(54) WATER TREATMENT KIT

(76) Inventor: Jonathan J. Bonelli, 200 E. 90th St., Apt. 4G, New York, NY (US) 10128

(*) Notice: Subject to any disclaimer, the term of this patent is extended or adjusted under 35 U.S.C. 154(b) by 0 days.

(21) Appl. No.: 09/374,021

(22) Filed: Aug. 13, 1999

Related U.S. Application Data

(60) Provisional application No. 60/098,424, filed on Aug. 31, 1998.

(51) Int. Cl.$^7$ .................................................. C02F 1/00
(52) U.S. Cl. ............... 210/198.1; 210/205; 210/237; 210/252; 422/261; 422/277; 239/34
(58) Field of Search .................. 210/169, 198.1, 210/205, 232, 237, 252; 422/261, 276, 277; 239/34

(56) References Cited

U.S. PATENT DOCUMENTS

| | | | | |
|---|---|---|---|---|
| 4,519,914 | * | 5/1985 | Etani | 210/169 |
| 5,064,624 | * | 11/1991 | King | 422/277 |
| 5,256,182 | * | 10/1993 | Friedman, Jr. et al. | 210/764 |
| 5,407,567 | * | 4/1995 | Newhard | 210/198.1 |
| 5,510,108 | | 4/1996 | Chouraqui. | |

* cited by examiner

*Primary Examiner*—David A. Simmons
*Assistant Examiner*—Betsey Morrison Hoey
(74) *Attorney, Agent, or Firm*—Dilworth & Barrese, LLP

(57) ABSTRACT

A water treatment kit includes a package; a housing stored within the package, the housing having a first water treatment chemical therein and a plurality of holes defined in an outer wall portion thereof for dispensing the first water treatment chemical into water; and at least one chemical dosage stored within the package independent of the housing, the chemical dosage comprising a second water treatment chemical; the first water treatment chemical of the housing and the second water treatment chemical of the chemical dosage being dispensed within the water at respective controlled rates to treat the water. The first water treatment chemical includes copper sulfate and a copper ionizable grid and the at least one chemical dosage includes sodium or potassium monopersulfate. The package includes a handle formed in an upper portion thereof to facilitate easy handling of the kit, and two molded half sections which are joined by a living hinge.

11 Claims, 4 Drawing Sheets

US 6,207,048 B1

WATER TREATMENT KIT

CROSS-REFERENCE TO RELATED APPLICATION

This application claims the benefit of U.S. Provisional Application No. 60/098,424, filed Aug. 31, 1998.

BACKGROUND OF THE INVENTION

1. Field of the Invention

The present disclosure relates to a water treatment kit, and, more specifically, to a swimming pool water treatment kit which enhances and/or replaces conventional chlorine treatment.

2. Description of the Related Art

Chlorine has been used for the treatment of water in swimming pools for many years. Chlorine is commonly sold in either a powder form or a tablet form and is dissolved in water to prevent the growth of algae and to kill bacteria.

However, the use of chlorine to treat water in swimming pools has been known to have disadvantages. For example, the chlorine tablets commonly used to treat water in swimming pools are known to cause the pH of the water in the pool to fluctuate drastically. Fluctuations between a pH level of 3 to 11 are not uncommon. Not only is the chlorine less effective at the these extremes in pH, the acidic water also irritates the eyes and other sensitive areas of persons swimming in the pool. In order to adjust the pH level to a neutral pH, additional chemicals must be added to the water to raise or lower the pH accordingly.

Another disadvantage of chlorine is that it must be added to the water on a daily basis to maintain the proper concentration. When the chlorine is first introduced into the water, the chlorine concentration is high and the bacteria and algae is effectively eliminated. However, as the chlorine concentration drops off and/or when more persons swim in the water, the bacteria and algae is not eliminated as effectively.

Thus, a need exists for a water treatment system which provides an alternative to chlorine while still providing an effective means for continuously treating swimming pool water and killing algae.

SUMMARY OF THE INVENTION

Accordingly, it is an object of the present invention to provide a safe, odorless, less expensive, and effective alternative to the conventional use of chlorine to treat water, particularly swimming pool water.

It is a further object of the present invention to provide a water treatment system in the form of a kit which incorporates the essential materials needed to effectively treat swimming pool water.

It is yet a further object of the present invention to provide said kit having the appropriate treatment means to maintain a swimming pool for approximately one season, e.g., ninety (90) days.

In one embodiment of the present invention a water treatment kit includes a package; a housing stored within the package, the housing having a first water treatment chemical therein and a plurality of holes defined in an outer wall portion thereof for dispensing the first water treatment chemical into water; and at least one chemical dosage stored within the package independent of the housing, the chemical dosage comprising a second water treatment chemical; the first water treatment chemical of the housing and the second water treatment chemical of the chemical dosage being dispensed within the water at respective controlled rates to treat the water. The first water treatment chemical includes copper sulfate and a copper ionizable grid and the chemical dosage includes sodium or potassium monopersulfate. The package includes a handle formed in an upper portion thereof to facilitate easy handling of the kit, and two molded half sections which are joined by a living hinge.

A method of treating water is also disclosed including the steps of placing a container, having a plurality of holes formed therein, into water; continuously dispensing copper sulfate pentahydrate through the plurality of holes formed in the container into the water; and placing at least one water treatment tablet formed of monopersulfate into the water at a rate of about one tablet every two weeks. The method of treating water may also include the step of cleaning the water in the pool prior to the step of placing the container into the water.

These and other objects, features and advantages of the present invention will become apparent from the following detailed description of illustrative embodiments, which is to be read in connection with the accompanying drawings.

BRIEF DESCRIPTION OF THE DRAWINGS

For a better understanding of the disclosure, reference is made to the following description of exemplary embodiments thereof, and to the accompanying drawings, wherein.

DETAILED DESCRIPTION OF PREFERRED EMBODIMENTS

Figure 1:
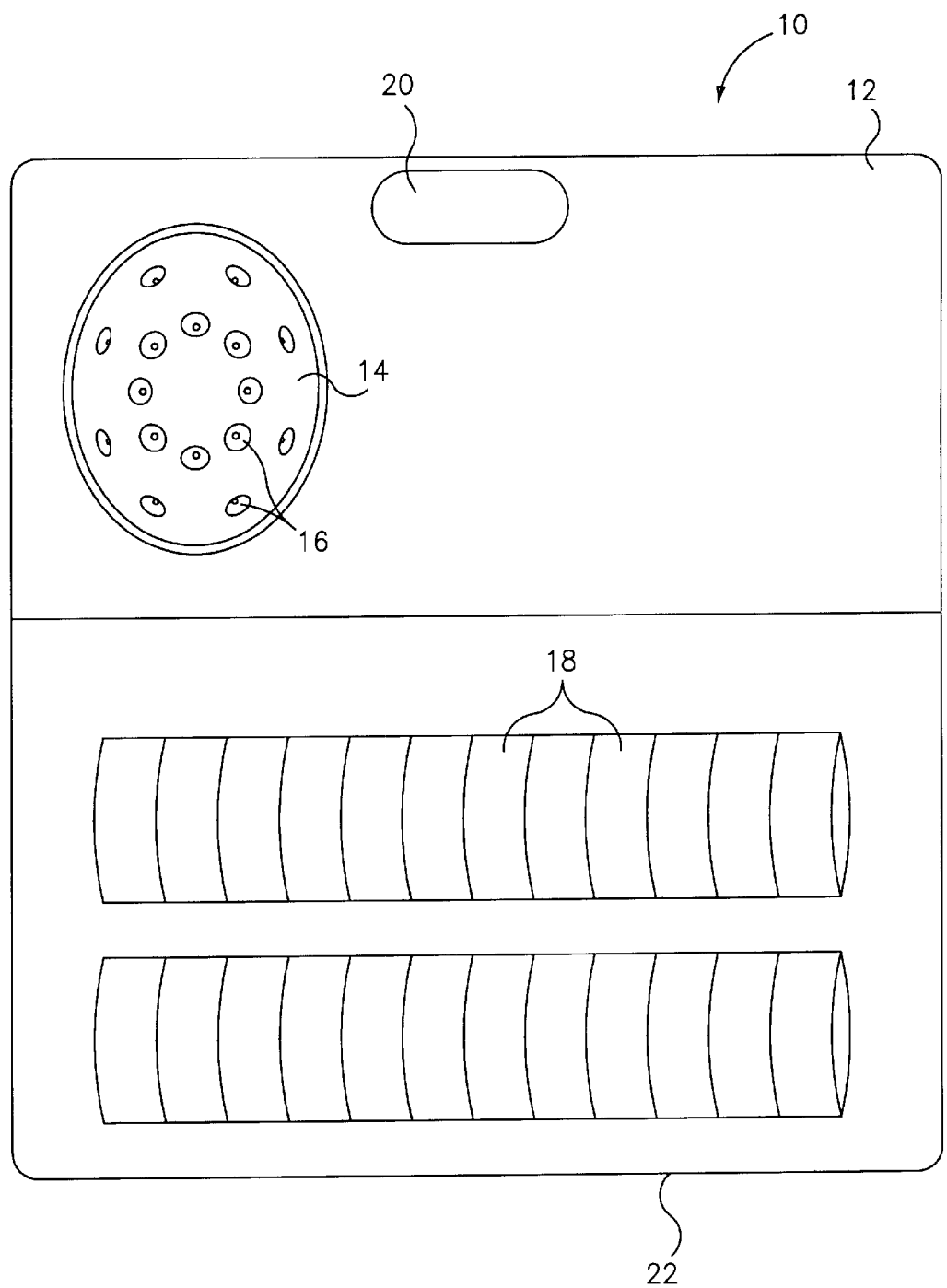
FIG. 1 is a frontal view of the presently disclosed swimming pool water treatment kit.

Referring now to the figures in detail, and initially to FIG. 1, there is illustrated a photograph of a complete kit for treating swimming pool water including an algaecide, ionizer and shock treatment. More specifically, the swimming pool water treatment kit 10 includes a plastic package or housing 12 and a Chlor™ No More Orb 14 for dispensing swimming pool chemicals disposed within the housing 12. The Chlor™ No More Orb 14, illustrated in FIG. 1 in the upper left corner of the plastic housing 12 and also illustrated in FIGS. 3–6, is an egg shaped sphere for containing the chemicals which kill algae and clarify the swimming pool water. Chlor™ No More Orb 14 is preferably red in color. However, it is contemplated that the Chlor™ No More Orb 14 may be manufactured in a plurality of colors, wherein the colors may be used to differentiate between kits designed for different size pools, for example. The Chlor™ No More Orb 14 includes a plurality of holes 16 therein to facilitate mixing of the swimming pool water and the chemicals contained within the Chlor™ No More Orb 14. The Chlor™ No More Orb 14 may be a single unit formed of a suitable polymeric material or may consist of two half sections connected to each other through welding means, snap-fit means, or the like. The chemicals housed within the Chlor™ No More Orb 14 preferably include copper sulfate and a copper ionizable grid. More specifically, the chemicals housed within the Chlor™ No More Orb 14 preferably include ninety-nine percent copper sulfate pentahydrate and one percent inert ingredients.

In the lower portion of the plastic housing 12, a plurality of treatment tablets 18 are stored in axial alignment. Preferably, twelve (12) or twenty-four (24) treatment tablets 18 are included in the swimming pool water treatment kit 10 such that a full seasonal supply of treatment is provided. Other quantities are envisioned as well. The treatment tablets 18 are preferably formed of sodium and/or potassium monopersulfate.

The plastic housing 12 preferably includes a handle 20 formed in an upper portion thereof to facilitate easy handling of the kit. The plastic housing 12 is preferably formed by conventional techniques, such as vacuum forming and/or injection molding. In one embodiment, the housing 12 includes two molded half sections which are joined by a living hinge 22 preferably disposed along the lower most portion of the half sections. Preferably, the two half sections are symmetrical, however, in some cases it may be preferable to mold the sections asymmetrically depending upon a particular purpose.

Figure 2:
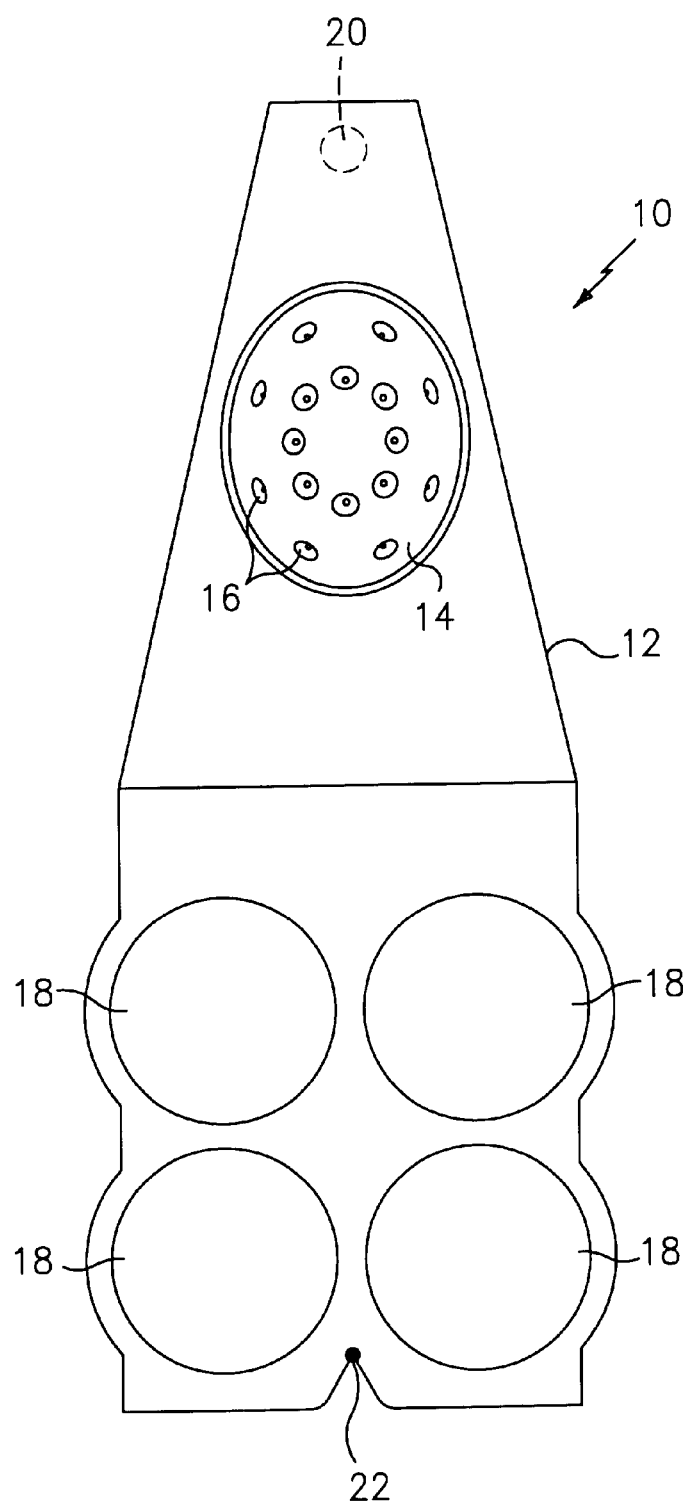
FIG. 2 is a side view of the swimming pool water treatment kit illustrated in FIG. 1.

Referring now to FIG. 2, it is apparent that two rows and two columns of treatment tablets 18 are provided. The configuration of the treatment tablets 18 advantageously allows twenty-four (24) treatment tablets 18 to be housed within a single compact plastic housing.

A basic flow diagram of how the treatment kit functions to clean the swimming pool water and directions for use of the kit are illustrated in the upper left hand corner of the rear portion of the swimming pool water treatment kit housing.

The directions for use of the Chlor™ No More Orb kit are as follows. The swimming pool water must be cleaned prior to using the Chlor™ No More Orb kit. If the user is opening the pool for the first time of the season, the pool should be "shocked" using known techniques. Once the pool water is cleaned, the Chlor™ No More Orb 14 must be removed from the plastic housing 12 and placed in a pool skimmer basket associated with the pool. The filter will assist in circulating the chemicals within the Chlor™ No More Orb 14 throughout the pool. The Chlor™ No More Orb 14 is designed to be left in the skimmer basket for the entire season (approximately 90 days). Chemicals and chemical ions released from the grid within the Chlor™ No More Orb are released to kill algae and clarify the water all season long. The user should maintain one to two parts per million copper sulfate pentahydrate in the water at all times. After the first use, the user may notice temporary clouding of the pool water. This clouding is due to the initial kill-off of algae and will disappear after approximately eight hours of filtering. Every two weeks thereafter, one or more treatment tablets 18, e.g., monopersulfate, must be placed into the skimmer basket. The presently disclosed swimming pool water treatment kit advantageously reduces chlorine usage at least up to eighty percent.

Figure 3:
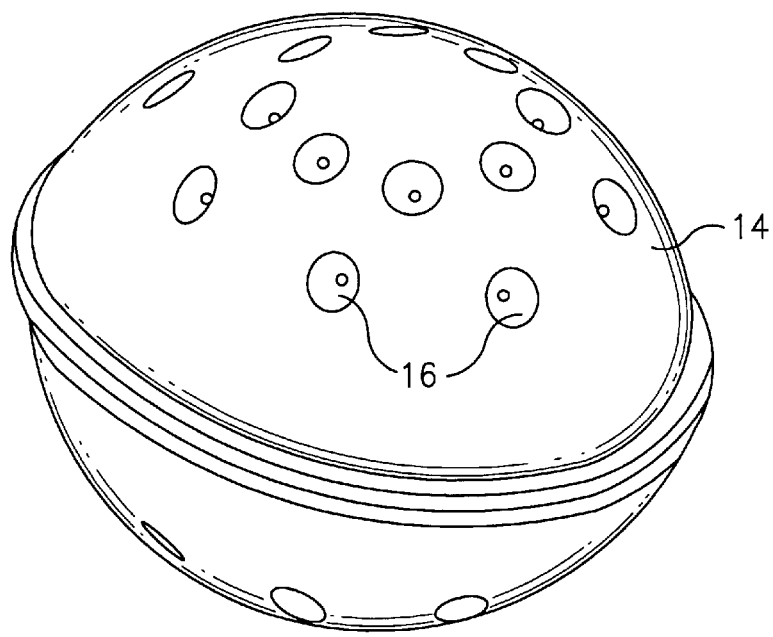
FIG. 3 is a perspective view of a dispenser for swimming pool chemicals in accordance with the present disclosure.
Figure 4:
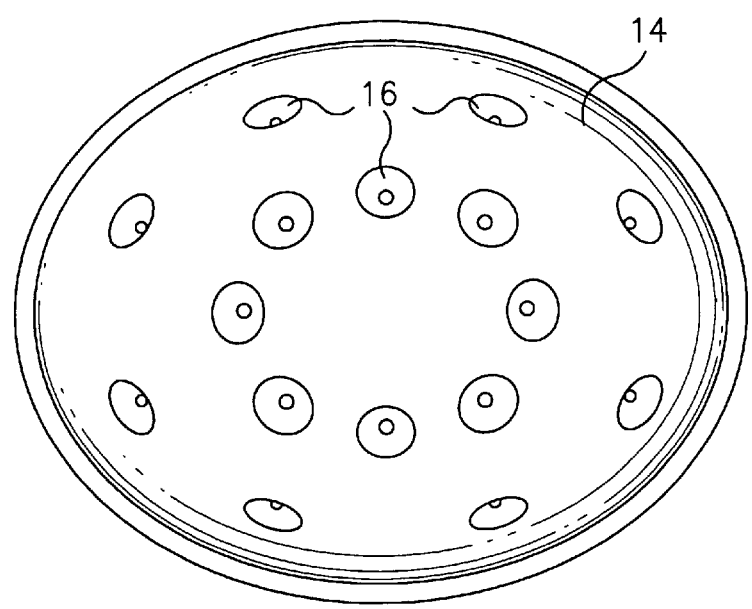
FIG. 4 is a top plan view of the dispenser for swimming pool chemicals illustrated in FIG. 3.
Figure 5:
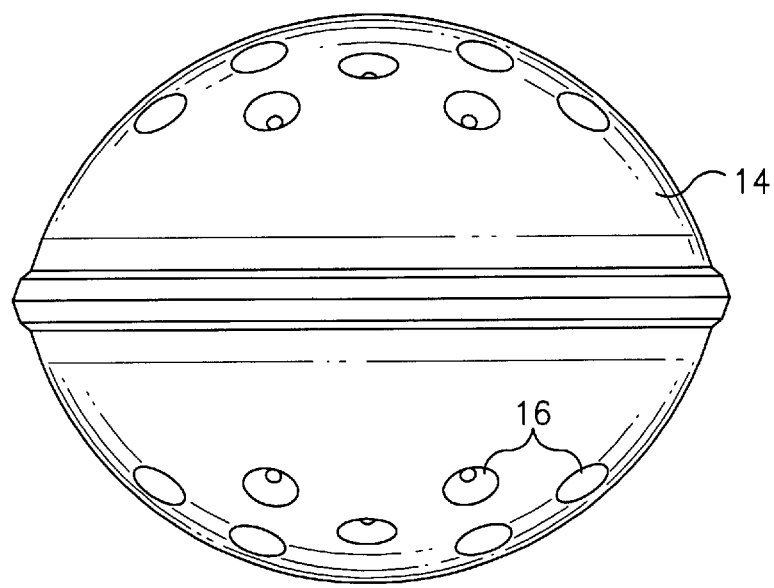
FIG. 5 is a side elevation view of the dispenser for swimming pool chemicals illustrated in FIG. 3.
Figure 6:
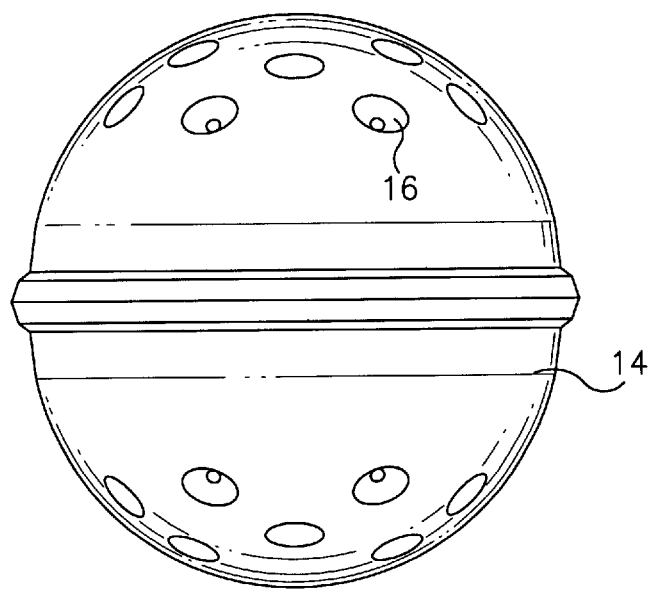
FIG. 6 is a front elevation view of the dispenser for swimming pool chemicals illustrated in FIG. 3.

As illustrated in the flow diagram on the upper left hand portion of the kit package, as seen in the rear view illustrated in FIG. 3, the swimming pool water continuously circulates through the Chlor™ No More Orb 14, i.e., through the holes defined therein. As the water circulates through the Chlor™ No More Orb 14, the grid therewithin is ionized. The water containing ions, e.g., copper ions, sulfate ions, and the like, mixes with the existing swimming pool water to destroy the algae therein and clarify the water. The clarified water is then returned to the pool and unclarified pool water is circulated through the Chlor™ No More Orb to continue the process.

The water treatment kit advantageously incorporates all the treatment materials necessary to clean and maintain a swimming pool for approximately a season, e.g., ninety days.

The presently disclosed swimming pool water treatment kit is preferably designed for pools having a capacity of up to 20,000 gallons of water. However, it is envisioned that the present kit can be easily modified to treat other pools of varying capacity. Moreover, it is envisioned that different chemicals can be used for treating, clarifying and/or reducing the algae with other types of pools or tanks, e.g., fishponds, fishtanks, aquariums, water parks, and/or water fountains.

Although the illustrative embodiments of the present invention have been described herein with reference to the accompanying photographs and drawings, it is to be understood that the disclosure is not limited to those precise embodiments and that various other changes in modifications may be effected therein by one skilled in the art without departing from the scope or spirit of the disclosure. All such changes and modifications are intended to be included within the scope of the disclosure as defined by the appended claims.

What is claimed is:

1. A water treatment kit comprising:
   a housing;
   a container stored within said housing, said container having a first water treatment chemical therein and a plurality of holes defined in an outer wall portion thereof for dispensing said first water treatment chemical into water;
   at least one chemical dosage stored within said housing independent of the container, said chemical dosage comprising a second water treatment chemical;
   said first water treatment chemical of said container and said second water treatment chemical of said at least one chemical dosage being dispensed within the water at respective controlled rates to treat the water; and
   an ionizing grid within said container.

2. The water treatment kit as recited in claim 1 wherein the housing is formed of plastic.

3. The water treatment kit as recited in claim 1 wherein the plurality of water treatment chemical dosages are formed as tablets.

4. The water kit as recited in claim 1 wherein said container is formed as an egg shaped sphere.

5. The water treatment kit as recited in claim 1 wherein said container is formed of a polymeric material.

6. The water treatment kit as recited in claim 1 further comprising a plurality of chemical dosages.

7. The water treatment kit as recited in claim 1 wherein the at least one chemical dosage comprises sodium.

8. The water treatment kit as recited in claim 1 wherein the at least one chemical dosage comprises potassium monopersulfate.

9. The water treatment kit as recited in claim 1 wherein the housing includes a handle formed in an upper portion thereof to facilitate easy handling of the kit.

10. The water treatment kit as recited in claim 1 wherein the housing includes two molded half sections which are joined by a living hinge.

11. A water treatment kit comprising:
   a housing;
   a container stored within said housing, said container having a first water treatment chemical therein and a plurality of holes defined in an outer wall portion thereof for dispensing said first water treatment chemical into water; and
   at least one chemical dosage stored within said housing independent of the container, said chemical dosage comprising a second water treatment chemical;

said first water treatment chemical of said container and said second water treatment chemical of said at least one chemical dosage being dispensed within the water at respective controlled rates to treat the water;

wherein the first water treatment chemical includes copper sulfate and a copper ionizable grid.

* * * * *